US010924382B1

(12) United States Patent
Khoury et al.

(10) Patent No.: US 10,924,382 B1
(45) Date of Patent: Feb. 16, 2021

(54) RAPID AND VERIFIABLE NETWORK CONFIGURATION REPAIR

(71) Applicant: Raytheon BBN Technologies Corp., Cambridge, MA (US)

(72) Inventors: Joud Khoury, Boston, MA (US); Michael Brandon Kremer, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 16/518,712

(22) Filed: Jul. 22, 2019

(51) Int. Cl.
*H04L 12/24* (2006.01)
*H04L 12/751* (2013.01)
*H04L 12/703* (2013.01)

(52) U.S. Cl.
CPC .............. *H04L 45/02* (2013.01); *H04L 45/28* (2013.01)

(58) Field of Classification Search
None
See application file for complete search history.

(56) References Cited

U.S. PATENT DOCUMENTS

| 8,023,515 B2 * | 9/2011 | Dobbins | H04L 12/467 370/395.53 |
| 2007/0150936 A1 * | 6/2007 | Maes | H04L 67/10 726/1 |

OTHER PUBLICATIONS

Gember-Jacobson, A, et al., "Automatically repairing network control planes using an abstract representation", Proceedings of the 26th, Symposium on Operating Systems Principles. ACM, (2017), 359-373.

* cited by examiner

Primary Examiner — Ayanah S George
(74) Attorney, Agent, or Firm — Schwegman Lundberg & Woessner, P.A.

(57) ABSTRACT

Discussed herein is technology for verifiable network configuration repair. A method can include adding a routing adjacency or route redistribution edge to a router of an aETG to generate an enhanced aETG (eaETG), adding, for each dETG of dETGs, static route edges to a destination of the dETG to generate an enhanced dETG (edETG), determining, for each of the edETGs, all simple paths from all sources to the destination of the edETG, determining a set of paths (pathset) over the determined simple paths that satisfies the policies, and translating the edge additions and/or removals in the eaETG and in the edETGs to an addition and/or removal of one or more of a routing adjacency, routing filter, or static route based on the determined pathset.

20 Claims, 5 Drawing Sheets

RAPID AND VERIFIABLE NETWORK CONFIGURATION REPAIR

GOVERNMENT RIGHTS

This invention was made with Government support under government contract FA8750-16-C-0176. The Government has certain rights in this invention.

TECHNICAL FIELD

Embodiments pertain to computer architecture and computer security. More specifically, some embodiments regard automatic network configuration repair and verification.

BACKGROUND

Network configuration is still largely a manual, time consuming, and error-prone process. In fact, even during steady state operations, a many network outages are due to misconfigurations in the network. The misconfigurations may be due to network complexity. It is very hard for a human to reason about a distributed network configuration due to the complex composition and interaction of the many control and data plane features and mechanisms involved at different layers. The composition and interaction may be on tens, hundreds, or even thousands of devices (e.g., from different vendors), not to mention the complex cross-policy and cross-traffic-class interactions. Additional complexity stems from reasoning about correctness despite failures, since some common outages and configuration backdoors only manifest because of these latent behaviors, such as after a link failure.

The problems of automated verification and repair of distributed network configurations (as opposed to centralized software-defined networks repair) are known to be intractable. Recent work has shown that automated repair is possible, offering two key insights. First, one can reduce a network's control plane to a graph, referred to as an Extended Topology Graph (ETG). Standard graph techniques can be used to reason about properties of paths allowed by the control plane. Second, when repairing a network configuration, one can organize and encode control plane configuration features as a hierarchy to effectively reason about feature interactions and semantics. While this approach is promising, it has several limitations. First, it is slow, and it does not scale to large networks. Experience extending a network shows that it can take tens of minutes to repair a simple network of 20 nodes and about 200 policies. Second, the repair does not always produce a correct solution when the intent specifies k-Reachable policies. In certain cases, the solution might produce k edge-disjoint paths for a k-Reachable policy where none of the paths contains the actual data plane path (which means the traffic class ends up being unreachable in the actual network). Third, a repair model does not support adding new configuration constructs, such as new routing adjacencies or new static routes that did not exist in the original configurations. Finally, the model has limited expressiveness and cannot support control planes where the route preferences cannot be modeled using global edge weights, as is the case for example with administrative distances, and border gateway patrol (BGP) local preferences.

DETAILED DESCRIPTION

Figure 1:
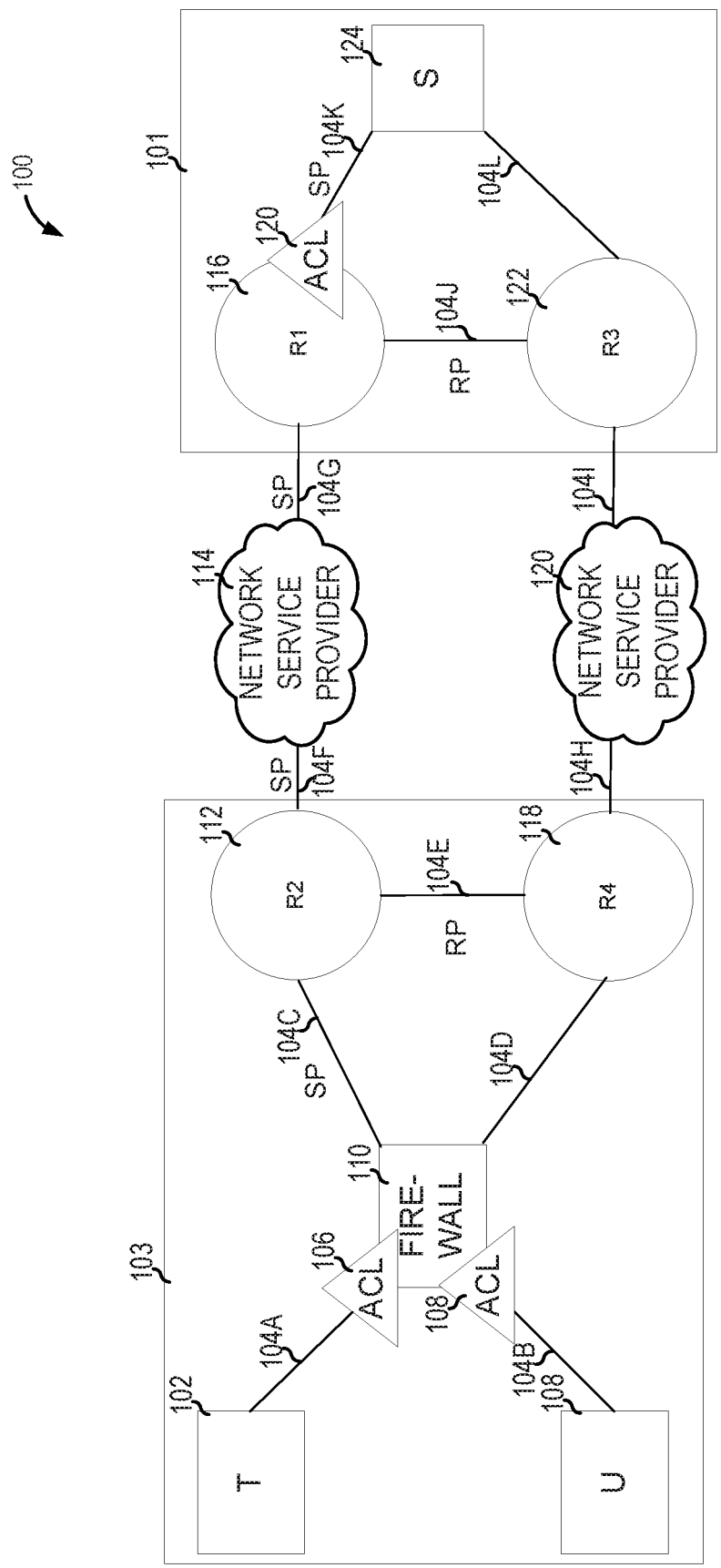
FIG. 1 illustrates, by way of example, a diagram of an embodiment of an example network of devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Network operators and cyber first responders may benefit from the ability to rapidly and verifiably reconfigure (repair) a network to satisfy a policy specification (sometimes called an intent). Reconfiguration may be needed to support constantly evolving requirements, such as modernization, security and availability, and compliance, or in more extreme situations, such as when restoring operations after an outage, or a cyberattack. Speed and verifiability of the repair effort are important to reduce time, effort, and risk to an organization. This is especially true when downtime could lead to loss of business, or even to loss of critical equipment such as with industrial control system networks. An automated, rapid, and verifiable network configuration repair capability is also an enabler for more effective autonomous cyber operations.

Embodiments provide a tool for automated and scalable configuration repair that extends control plane repair (CPR) and addresses its limitations. Reference is made herein to CPR as detailed in A. Gember-Jacobson, A. Akella, R. Mahajan, and H. H. Liu, "Automatically repairing network control planes using an abstract representation," in Proceedings of the 26th, Symposium on Operating Systems Principles. ACM, 2017, pp. 359-373.

Embodiments take as input a copy of the existing network device configuration files (the original configuration), a specification of intent, and optionally a whitelist file. The intent specifies a set of path-based policies such as k-Reachability, waypointing, blocking, and primary paths, all of which may be satisfied by the repair. Embodiments can provide a modified copy of a network configuration file (target configuration) that is guaranteed to satisfy the intent, and that is optimal. An optimizer can minimize a total number of configuration changes to the original network configuration files in order to satisfy intent, reducing the risk associated with the repair. The model is granular and allows formulating other more suitable objectives depending on application. Embodiments can achieve scalability by dividing an intractable search space of a repair problem into two smaller sub-problems.

A first sub-problem computes optimal sets of paths (pathsets) to satisfy the intent. As with CPR, edges on these pathsets translate to control plane constructs, such as routing adjacencies, route filters, route redistribution, and static routes. This sub-problem is efficiently encoded and solved using a constraint solving technique, such as with Satisfiability Modulo Theories (SMT), and shown to scale to other networks.

With the pathset solution, the second sub-problem specializes these paths to satisfy data plane constraints, mainly primary paths constraints and access control lists (ACLs). Primary paths are set by adjusting administrative distances and routing protocol metrics. This sub-problem can be solved using efficient graph techniques.

Embodiments achieve several orders of magnitude speedup over CPR without sacrificing optimality. As a result, embodiments are able to scale to much larger networks with hundreds or more devices, making embodiments a practical repair tool for distributed control planes. Embodiments were evaluated on two real networks, a 20 node network and a 180 node network, and on hundreds of synthetic networks. Embodiments are able to repair a 20 node network configuration within about 1.2 seconds, as compared to 1,200 seconds (20 minutes) using CPR. Further, embodiments can scale to much larger networks.

In addition to scalability, embodiments are expressive in that they can support primary path policies even in the presence of local preferences and administrative distances, which makes embodiments applicable to a wider range of control plane configurations. Embodiments can extend a CPR implementation to support hierarchical policy groups at different granularities, and implement support for adding routing adjacencies, static routes, route redistribution, and blocking at the control plane.

Embodiments can rapidly and verifiably provide data indicating reconfiguration of internet protocol (IP) networks, such as during restoration efforts, for example. Large utility networks can have hundreds of routers and firewalls, zoning and electronic security perimeters (ESP), strict security and compliance requirements, and high availability requirements. For example, to comply with mandatory Critical Infrastructure Protection (CIP) requirements, transmission utilities must implement controls for protecting critical cyber assets. Several of these controls may be directly mapped to intent policies (see for example ESP and extensible authentication protocol (EAP) protections and white-listing in CIP 005-6 and 007-6).

Since utility networks that carry real time traffic are fairly static in nature, with well-defined endpoints and data flows, operators can use embodiments to succinctly specify intents, and to rapidly and verifiably repair their networks to satisfy them. This significantly reduces the risk and cost associated with reconfiguring networks, and provides rigorous guarantees and evidence of correctness to operators and compliance auditors.

The next section introduces concepts in configuration repair as constraint solving and discusses some limitations of the state-of-the-art CPR approach. Then, embodiments are discussed presenting an approach for achieving significant speedups without sacrificing optimality.

A policy group represents a group of endpoints (e.g., a single host, a set of hosts, a subnet) that share some forwarding behavior.

A traffic class represents traffic flowing from a source policy group to a destination policy group.

A policy statement associates a property with a traffic class (e.g., traffic is reachable or blocked).

An intent is a set of policy statements.

FIG. 1 illustrates, by way of example, a diagram of an embodiment of an example network 100 of devices. The network 100 connects a substation 101 (hosting a first router (R1 116), third router (R3 122), and a node S 124) to a control center 103 (hosting a second router (R2 112), fourth router (R4 118), a firewall (F 110), and two nodes T 102, U 108). The sites (substation 101 and control center 103) are connected over a backbone (e.g., a multiprotocol label switching (MPLS) backbone) provided by a network service provider (NSP 114). The network carries traffic (e.g., distributed network protocol three (DNP3) or other traffic) over a port (e.g., a transmission control protocol (TCP) port, such as port 20,000) between S 124 and T 102 or U 108. Assume, for explanation purposes, that network engineers decided to add another fully redundant path (routers R3 122 and R4 118) over a different NSP 120 between the two sites. This addition can, for example, increase availability of the network 100. Operators, as a result want to automatically reconfigure the network 100 (i.e., repair the original configuration) to satisfy an intent specification.

A node is device that sends or receives data over the network 100. The node can include an appliance, a machine, a computing device, a vehicle, or the like, that includes communication circuitry capable of sending or receiving traffic over the network 100.

The firewall 110 is a device that is designed to block unauthorized access while permitting outward communication. The firewall 110 monitors and controls incoming and outgoing network traffic based on security rules. The firewall 110 can include or have access to an access control list (ACL) 106, 108. An ACL defines which users or system processes are granted access to objects, as well as what operations are allowed on the object. The ACL 106 defines users, processes, or operations that are allowed on T 102. The ACL 108 defines users, processes, or operations that are allowed on U. The firewall 110 can enforce the permissions defined on the ACL 106, 108.

A router (e.g., R1 116, R2 112, R3 122, R4 118) is a device that forwards data packets between computer networks. Routers generally perform the traffic directing functions of a network or between networks. R1 116 can enforce an ACL 120 that defines users, processes, or operations that are allowed on S 124.

Physical connections 104 generally carry traffic between devices of the network 100. Physical connections 104A, 104B, 104C, 104D, 104E, 104F, 104G, 104H, 104I, 104J, 104K, 104L are specific instances of a physical connection 104 as indicated by the letter suffix on the reference number. A physical connection is coupled to a port of a first device and a port of a second device. The physical connections 104E, 104J can operate in accord with a routing communication protocol (RP). Example RPs include hot standby router protocol (HSRP), virtual router redundancy protocol (VRRP), and gateway load balancing protocol (GLBP), among others. The physical connection 104 labelled with "SP" indicate a shortest (prioritized) path. The SP can be determined using an open shortest path first (OSPF) or similar protocol.

An NSP provides bandwidth or network access by providing direct internet backbone access to internet service providers. The NSP 114, 120 can provide the substation 101 and the control center 103 with access to a network access point. Example NSPs include telecommunications companies, data carriers, wireless communication providers, ISPs, and cable television providers.

An example intent specification regarding the previously mentioned network re-configuration (e.g., repair) is provided:

1. S/32<- ->T/32:20000, TCP; k=2
2. S/32<- ->U/32:22, TCP; k=1
3. S<- ->*, ICMP; k=1
4. U<- ->*, ICMP; k=1
5. Block everything else to/from S, T, U
6. S<- ->T, {R1.ospf, R2.ospf, F.ospf}

This re-configuration is intended to incorporate the new path through the NSP 120 and to further harden the network 100 to satisfy the intent. Note that this specification assumes a transmission control protocol (TCP), internet control message protocol (ICMP), and OSPF are used. These are just example network protocols and other protocols can govern communication between devices of the network 100.

An intent, a single numbered item of the re-configuration, can specify any combination of the following classes of path-based policies:

k-Reachability: Source should be able to reach destination despite any (k−1) link failures (there are at least k disjoint control-plane paths between A and B).

Waypointing: All control plane paths from source to destination pass through a waypoint, such as a firewall.

Blocking: Source should not be able to reach destination. Blocking reachability can be achieved at the control plane (e.g., by removing adjacencies or routes or by adding route filters) or at the data plane (e.g., by adding ACLs). The operator can specify if they want blocking at the control plane. If unspecified, embodiments may prefer blocking at the control plane and revert to data plane blocking otherwise.

Primary paths: specifies the primary path that should be taken from source to destination when there are no failures. Currently, the operator must have a granular understanding of the control plane routing processes when specifying primary paths. In some embodiments, a device-level primary path specification can be supported. Embodiments may support multi-path routing whereby the primary path policy specifies a set of edge disjoint paths instead of just a single path.

Returning to the intent specification above, the statements 1-4 in the intent are k-reachability policies, Line 5 is a blocking policy, and Line 6 is a primary path policy. The notation S/32 refers to a specific internet protocol (IP) host address (the address itself is not relevant), while S refers to the whole subnet; the same applies to T and U.

Line 1 specifies that a bidirectional DNP3 over TCP/IP flow between servers in S and T should be reachable on k=2 edge-disjoint paths (this flow should be reachable despite any k−1 link failures). Line 2 specifies a 1-reachable secure socket shell (SSH) flow between hosts in S and U. Line 3 specifies all internet control message protocol (ICMP) traffic from subnet S should be reachable (and similarly line 4). Line 5 specifies that everything else not explicitly reachable as specified in the intent should be blocked. This ability to specify everything else should be blocked ensures completeness of the reachability specification. Finally, line 6 specifies the primary path for the real time traffic between S and T which includes the DNP3 flow.

Both reachability and blocking policies implicitly satisfy failure consistency. This means either all paths from source to destination are reachable or all of them are blocked. Embodiments can enforce failure consistency since violating failure consistency is likely due to a misconfiguration. For example, an ACL on a primary path that is not on a secondary path or vice versa means that the policy will be violated after the primary path fails.

Automated Repair as Constraint Solving

Figure 2:
FIG. 2 illustrates, by way of example, a diagram of an embodiment of network control plane configuration constructs that affect forwarding organized hierarchically as a tree of ETGs.

FIG. 2 illustrates, by way of example, a diagram of an embodiment of network control plane configuration constructs that affect forwarding organized hierarchically as a tree of ETGs. An ETG is a digraph abstraction that models the behavior of routing protocols of a network and their interactions under arbitrary failures. Vertices correspond to routing processes, where each routing process on a device has an incoming (IN) and one outgoing (OUT) vertex. Edges represent the flow of data traffic enabled by the exchange of route advertisements between the connected processes. A set of ETGs can be created to represent an original network configuration.

At the top level of a hierarchy, the all ETG (aETG 220), captures configuration constructs that apply to all destinations, such as routing protocol adjacencies and route redistribution. One level below the aETG, there may be one ETG per destination (the dETG 222) that captures destination-specific configuration constructs, such as route filters and static routes. Finally, below each dETG, a traffic class ETG (tcETG 224) for each source captures constructs that apply to the specific source-destination traffic class, mainly Access Control Lists (ACLs).

By construction, the aETG 220 includes vertices corresponding to routing processes, and edges corresponding to routing adjacencies and route redistribution. Each dETG 222 extends the aETG 220 by adding a special destination vertex, adding all edges corresponding to static routes for the destination, and removing any edges based on existing route filters for the destination. Each tcETG 224 extends the dETG 222 adding a special source vertex, and removing any edges based on ACLs that filter the traffic class.

The presence or absence of edges in the ETGs 220, 222, 224 correspond to the presence or absence of the different configuration constructs. For example, an edge that exists in the aETG 220 corresponds to a routing adjacency. If the edge does not exist in a child dETG 222 for a destination, it means there is a route filter that filters the destination. In the same way, if an edge does not exist in a tcETG 224 for a source-destination traffic class but the edge exists in the parent dETG 222, that corresponds to an ACL that filters the source-destination traffic class.

By carefully constructing the ETGs, one can encode the aforementioned control plane configuration constructs simply as Boolean edges, compute an optimal assignment of edge variables that satisfy the policy constraints (as well as other topology and consistency constraints), and translate the edge assignments back to configuration constructs to generate the repaired configuration. Embodiments can extend prior ETG generation techniques to support adding new routing adjacencies, route redistribution, and static routes that did not exist in the original configuration. Note that in certain cases, the only repair solution that satisfies the intent requires adding these new configuration constructs. For example, in FIG. 1, if the primary path from S 124 to T 102 is different than that from S 124 to U 108, the solution can be to add a static route for one of the destinations in order to satisfy the intent. Despite adding new configuration constructs, the repair problem should not be confused with the configuration synthesis problem. The scope of the repair problem is still to repair an original configuration rather than to synthesize a new one, and unlike with synthesis optimality, repair can still be defined as minimizing the number of configuration changes.

Figure 3:
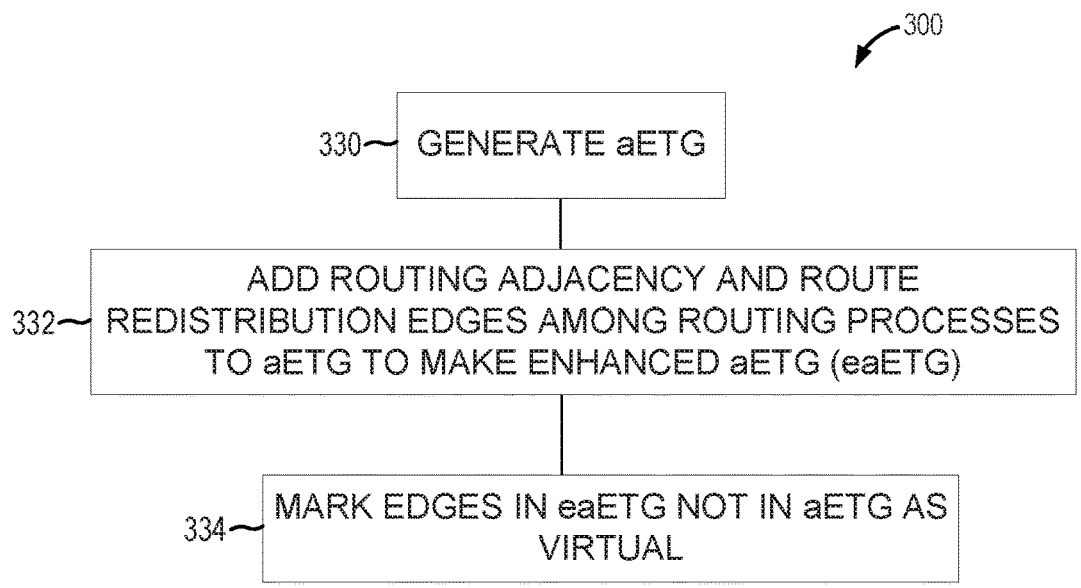
FIG. 3 illustrates, by way of example, a flow diagram of an embodiment of a technique for generating an enhanced aETG (eaETG).

FIG. 3 illustrates, by way of example, a flow diagram of an embodiment of a technique 300 for generating an enhanced aETG (eaETG). The technique 300 includes generating an aETG, at operation 330; adding (all possible) routing adjacency and (all possible) routing redistribution edges among routing processes to aETG to generate the eaETG, at operation 332; and marking all edges of the eaETG that are not in the aETG as virtual, at operation 334. The operation 330 can include using a technique detailed in CPR.

Figure 4:
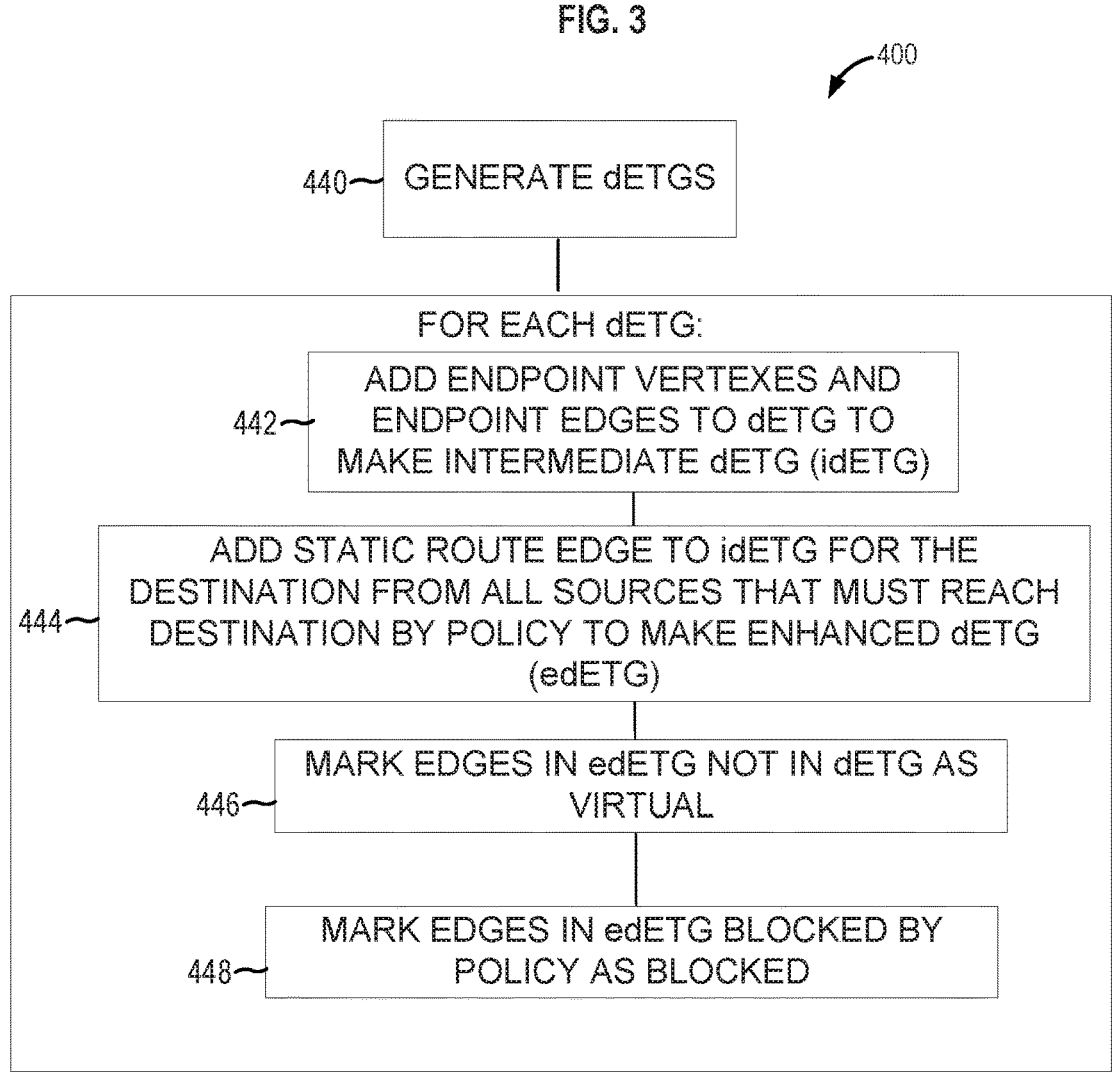
FIG. 4 illustrates, by way of example, a flow diagram of an embodiment of a technique for generating an enhanced dETG (edETG).

FIG. 4 illustrates, by way of example, a flow diagram of an embodiment of a technique 400 for generating an enhanced dETG (edETG). The technique 400 includes generating a dETG, at operation 440; adding endpoint vertexes and endpoint edges to dETG to make an intermediate dETG (idETG), at operation 442; adding static route edge to idETG for the destination from all sources that must reach destination by policy to make edETG, at operation 444; making edges in edETG not in dETG as virtual, at operation 446; and marking edges in edETG blocked by policy as blocked, at operation 448. The operation 440 can be performed for each destination defined in a policy. The operation 442 can include adding respective vertexes for all sources and one vertex for each destination. At operation 448, the edETG edge can be blocked due to a route filter.

The technique 300 can be performed to generate an eaETG and the technique 400 can be performed to generate edETGs for each destination defined in a policy. The technique 400 can include initializing a list of all simple paths to include all source-destination simple paths to all simple paths in the aETG generated at operation 330. The generated edETGs from the technique 400 can then be used to determine all simple paths from all sources to the destination. The list of all simple paths can be updated to include all simple paths from the edETGs.

The technique 400 can be performed before determining all the possible source-destination simple paths (a path that does not repeat a vertex) based on the edETGs. The techniques 300, 400 improvements on prior network repair techniques. The techniques 300, 400 shows how embodiments can extend an ETG creation to compute all the possible source-destination simple paths. In the technique 400, a Dijkstra-like technique can be used to compute all simple paths between a set of source vertexes and a destination vertex in each dETG. Note how embodiments do not compute the traffic class ETGs at this point, as those are not needed for simple path computation. tcETGs may be computed during data plane repair.

When computing all possible static route virtual edges (operation 444), one can tune the technique 400 with different strategies to tradeoff efficiency and completeness. Strategy S5 specifies not to add any new static route edges. Strategy S5 is the fastest. Strategy S4 specifies to only add a virtual static route edge between two connected devices that either do not have a shared routing process, or have a shared routing process but the adjacency is blocked in the original configuration (e.g., due to a route filter). Strategy S3 specifies to only add a virtual static route edge between two devices when there is no shared routing process between them in the original configuration. Strategy S2 adds a virtual static route edge on all simple paths from each source to the destination (for all traffic classes for the destination). The slowest brute force strategy, S1, adds all possible virtual static route edges in the idETG without any filtering.

By construction, ETGs are pathset-equivalent when routes are redistributed between multiple protocols (e.g., an open shortest path first (OSPF), routing information protocol (RIP), and external border gateway protocol (eBGP)). This means that an ETG contains a path between source and destination endpoints if and only if the path is used in the real network under some combination of failures. Pathset-equivalence may be valuable for network analysis as it allows a quick check for certain path-based properties such as reachability, blocking, waypointing, and isolation using standard graph traversal techniques, such as shortest path and mincut techniques. Pathset-equivalence may be valuable for network repair as it allows for efficiently encoding the problem. This is because all possible simple paths can be enumerated and an optimal pathset over those simple possible simple paths can be determined to satisfy a desired set of path-based constraints (intent).

Limitations of CPR

First, the semantics of tcETGs primarily help determine repairs to ACLs, whereby adding or removing a tcETG edge corresponds to removing or adding an ACL. This approach has several limitations. Encoding the edges for all the tcETGs directly into a constraint solver formulation significantly reduces scalability. Example constraint solvers include the Z3 solver which supports Satisfiability Modulo Theories (SMT) and optimization using soft constraints (MaxSMT).

Specifically, the problem size increases multiplicatively with the number of traffic classes, m, in the intent specification. The number of traffic classes, m, scales as $O(n^2)$ for a network with n policy groups, especially when completeness of the reachability specification is important to the operator as part of the intent specification—when an operator specifies an explicit policy (k-Reachable or blocked) for each of the $n^2$ policy groups in the network, instead of an implicit do not care policy. In addition, constraining ACL optimization to edge addition/removal is inconsistent with the optimality objective since the solution ends up with a correct, but unoptimized combination of permits and denies within an ACL. This necessitates some post-processing repairs (e.g., during translation) to optimize the ACLs, which are not accounted for in the optimization cost.

Second, an important limitation of CPR is that even if the intent specifies a k-Reachable policy for a traffic class, the repair solution does not guarantee this property, unless an additional primary path policy is explicitly defined for the traffic class. Specifically, for a k-Reachable traffic class, the repair computes a set of k edge-disjoint paths, and it can be that none of these paths is the actual data plane path taken. For example, the actual data plane path might be blocked by an ACL, and the traffic class will not be reachable under no failures in the resulting solution. In order for the repair solution to guarantee the k-Reachable policy for a traffic class is satisfied, it can ensure that the actual data plane path is reachable in the solution without requiring an explicit specification of a primary path policy for the traffic class.

Third, CPR strives to satisfy path-equivalence guarantees on the ETGs, which allows verifying that two control planes are equivalent under arbitrary failures. While path-equivalence can be desirable, it is often too strong of a guarantee and is accordingly hard to achieve without a fine-grained model of the control plane, which comes at the cost of scalability. In practice, verifying and repairing primary path policies does not require path-equivalence guarantees on the ETGs since primary path policies only require knowing the actual data plane path under no failures rather than under arbitrary failures.

Fourth, CPR does not support adding new constructs, such as new routing adjacencies and static routes, that did not exist in the original configurations. Adding these constructs requires carefully extending the ETGs with new virtual edges as discussed regarding the techniques 300, 400. CPR also does not support policy groups that overlap in any way (e.g., a /32 host is part of a /24 subnet as different policy groups) which is very common practice in whitelist ACLs (e.g., the host to support policy groups subsumed by other policy groups). In embodiments, policy groups can be extended with ports and protocols from ACLs.

Repair techniques of embodiments are now described. Embodiments allow for better scalability by eliminating tcETGs, without sacrificing optimality. To still account for ACL repairs after eliminating tcETGs, the pathset computation can include edge weights adjusted in the soft constraints as described in more detail elsewhere herein. Embodiments may guarantee the correctness of k-Reachable policies. To satisfy a k-Reachable traffic class policy, at least k edge-disjoint paths exist in the control plane, and all edge-disjoint paths are reachable (i.e. none of them is blocked by an ACL or the like). This does not require knowledge of the exact data plane path for the traffic class in the solution (among all available control plane paths).

After a pathset solution is determined, embodiments can compute an assignment (e.g., an optimal assignment) of administrative distances and protocol metrics to satisfy primary path policies. Embodiments can use other graph techniques to determine optimal modification to ACLs.

Computing Pathsets

Let $G_{all}=(V_{all}, E_{all})$ be the aETG, and for each destination dst, let $G_{dst}=(V_{dst}, E_{dst})$ be the corresponding destination ETG. For each $G_{dst}$, and for each directed edge $(u, v) \in E_{dst}$, create a Boolean variable $e(u, v)_{dst}$ or simply denoted as $e_{dst}$ when the corresponding edge is clear from context. Similarly, for each edge in the aETG $E_{all}$, we create a Boolean variable $e(u, v)_{all}$ or simply denoted as $e_{all}$. For each traffic class tc in the intent, create a single Boolean variable $dpblock_{tc}$. Setting this variable corresponds to blocking the traffic class at the data plane.

Create another set of variables to handle the k-Reachability policies. Let R be the set of traffic classes that must be k-Reachable, and B be the set of traffic classes that must be blocked according to policy. For each traffic class tc, let $P_{tc}$ be the set of all simple paths from tc.src to tc.dst in $G_{tc.dst}$. For each path $p \in P_{tc}$, let $E_{tc.dst}^{p,tc}=\{(u, v):(u, v) \in p\}$, the set of all edges on the pathp in $G_{tc.dst}$. For each such edge $(u, v) \in E_{tc.dst}^{p,tc}$, for all $tc \in R$, and for each index $i \in [1, tc.k]$, create a new variable $e_{tc.dst}^{i,p,tc}$. Let $p^*_{tc} \in P_{tc}$ be the primary path for traffic class tc when specified by policy. The function exists((u, v), G) is true if the edge is neither virtual nor blocked in the ETG G, and false otherwise. The function fixed(u, v) is true if edge (u, v) is a source edge, or an in-to-out edge of a process on a device, or an edge from a static process to a destination vertex.

The following pseudocode shows an efficient constraint problem encoding for computing an optimal set of paths to satisfy a desired intent.

// Topology and protocol constraints
1. $\forall (u, v)$ s.t. fixed $(u, v)$: $e(u, v)_{dst}$ //only for fixed edges
2. $\forall (u, v)$ s.t. !fixed $(u, v)$: $e(u, v)_{dst} \Rightarrow e(u, v)_{all}$ //only for non-fixed edges for //which there is an aETG edge
3. $\forall e_{dst}: e_{dst}$=dual(east) // only for routing adjacency edges that have duals;
   //symmetry of adjacencies
// k-Reachable constraints
4. $\forall tc \in R, i \in [1, tc.k], p \in P_{tc}: \bigvee_{p \in P_{tc}} \bigwedge_{(u,v) \in E^{p,tc}} e(u, v)_{tc.dst}^{i,p,tc}$//at least one path is set for //each index
5. $\forall tc \in R$: atmost1$(e_{tc.dst}^{1,p,tx}, \ldots, e_{tc.dst}^{k,p,tc})$ // edge disjoint paths
6. $\forall tc \in R, i \in [1, tc.k], p \in P_{tc}: e_{tc.dst}^{i,p,tc} \Rightarrow e_{tc.dst}$
//Enable primary path
7. $\forall (u,v) \in p^*_{tc}: e(u, v)_{tc.dst}^{1,p^*,tc}$
//Blocked constraints
8. $\forall tc \in B, p \in P_{tc}: dpblock_{tc} \vee \neg (\bigvee_{p \in P_{tc}} \bigwedge_{(u,v) \in E_{tc.dst}^{p,tc}} e_{tc.dst})$
   //either none of the paths are reachable or blocked at data plane
   //soft constraints to minimize number of changes
9. $\forall (u, v) \in E_{all}$ s.t. exists$((u, v), G_{all})$: soft$(e(u, v)_{all}, \alpha)$
   //only for non-fixed //edges; try to find a solution that does not modify an edge
10. $\forall (u, V) \in E_{all}$ s.t.! exists$((u, v), G_{all})$: soft$(\neg e(u, v)_{all}, \alpha)$ //only for non-//fixed edges; try to find a solution that does not modify an edge
11. $\forall dst, \forall (u, v) \in E_{dst} \cap E_{all}$ s.t. exists$((u, v), G_{dst})$==exists$((u, v), G_{all})$: soft$(e(u, v)_{dst}=e(u, v)_{all}, \alpha)$
12. $\forall dst, \forall (u, v) \in E_{dst} \cap E_{all}$ s.t.! exists$((u, v), G_{dst})$: soft$(\neg e(u, v)_{dst}, \alpha)$
13. $\forall dst, \forall (u, v) \in E_{dst}/E_{all}$ s.t. exists$((u, v), G_{dst})$: soft$(e(u, v)_{dst}, k)$// try
   //to find solution that does not modify edge, only for static edges or edges
   //that connect to destination
14. $\forall dst, \forall (u, v) \in E_{dst}/E_{all}$ s.t.! exists$((u, v), G_{dst})$: soft$(\neg e(u, v)_{dst}, k)$
   //try to find solution that does not modify edge
15. $\forall tc \in B$: soft$(\neg dpblock, \beta)$ // $\beta$ try to not block at the data plane Line 2 of the pseudocode can be applied to edges that exist in both dETG and aETG (i.e. does not include static route edges). Line 3 of the pseudocode can enforce symmetry for routing adjacencies. For example, an OSPF routing adjacency between the OSPF process on router b and that on router c must be symmetric (i.e. the variable for edge b.OSPF.default.OUT→c.OSPF.default.IN must be equal to its dual c.OSPF.default.OUT→b.OSPF.default.IN.

Together, lines 4-6 of the pseudocode help ensure that there are k edge-disjoint paths for a k-Reachable policy. Line 4 asserts that at least one simple path exists for a traffic class in the corresponding dETG for each index $i \in [1, tc.k]$, where a path exists means all edge variables on to the path are set. For example, if there are two paths between source S 124 and destination T 102, $\{(s, x), (x, t)\}$ and $\{(s, y), (y, t)\}$, and k=1, then assert $((s, x) \wedge (x, t)) \vee ((s, y) \wedge (y, t))$. This is possible because all the possible simple paths from all relevant sources to each destination are enumerated. This is further possible because of the pathset-equivalent property of the ETG.

Line 5 of the pseudocode asserts edge disjointness of each of the k paths for each flow, where an edge $(u, v)_{tc.dst}^{i,p,tc}$ can only be set on at most one of the k paths for a traffic class. Line 6 of the pseudocode relates the edge disjoint variables to the original edge variables in the dETG. Line 7 of the pseudocode ensures that the primary path for a traffic class, when specified, is enabled. Note that, in the pseudocode, the index i is set to 1 edge variables but any index within the k indexes works.

Line 8 of the pseudocode enforces the blocking constraint. A traffic class is blocked if and only if either none of the paths in the dETG for the traffic class are reachable, or the $dpblock_{tc}$ variable is set. Combined with the soft-constraint on line 15, this ensures that a minimum cost solution will first try to disable all the control plane paths, and only when that is not possible, then pay the large cost 3 of setting the dpblock$_{tc}$ variable. The solution will tell us when to block at the data plane, which will be input to a reconfiguration technique discussed later.

The rest of the pseudocode defines weighted soft-constraints for computing an optimal solution. Each soft-constraint has a weight and a constraint solving technique minimizes the total weight of violated soft-constraints. The defined soft-constraints minimize the total number changes to edge variables, which corresponds to minimizing actual configuration changes.

Lines 9-12 assert the soft-constraints corresponding to the required number of changes as shown in Table I, which shows how the number of violated soft-constraints corresponds to the number (and type) of configuration changes.

TABLE 1

Configuration changes for violated soft constraints

| Edge in Original | | Edge in Solution | | Constraints | Corresponding |
|---|---|---|---|---|---|
| aETG | dETG | aETG | dETG | Violated | Config Changes |
| 0 | 0 | 1 | 0 | Line 13, 14 | 2 (add adjacency (adj) + filter) |
|  |  | 1 | 1 | Line 13 | 1 (add adj) |
| 1 | 0 | 0 | 0 | Line 12 | 1 (remove adj) |
|  |  | 1 | 1 | Line 15 | 1 (remove filter) |
| 1 | 1 | 0 | 0 | Line 12 | 1 (remove adj) |
|  |  | 1 | 0 | Line 14 | 1 (add filter) |

Other protocol-specific constraints may be added to the constraint problem formulation. For example, since single area OSPF does not support route filters, once can assert that the state of routing adjacency edges in the dETG are equivalent to those in the aETG.

Embodiments can be extended to account for existing ACLs when computing a repair (i.e. when computing an optimal pathset). Embodiments can account for an ACL even though a tcETG was eliminated. To account for an ACL, associate each disjoint edge variable for a reachable tc path p, with a variable indicating whether there is an ACL on the edge that must be removed to enable the traffic class. Then add soft constraints to enable those disjoint edges with ACLs on them (i.e. soft($\neg e(u, v)_{t.dst}^{i,p,tc}$)).

Satisfying Data Plane Constraints
Primary Paths

Given a pathset solution that includes all primary paths, embodiments can adjust protocol metrics and/or local preferences to help ensure that the data plane path matches the primary path of an intent. This problem reduces to adjusting administrative distances and routing instance metrics to ensure the primary path is the chosen best path. Recall that solving this primary path problem does not necessarily require path-equivalence. This is at least because the primary path is only of concern under no failures instead of under arbitrary failures. Hence, unlike CPR, primary paths can be satisfied for all control planes under which a pathset-equivalent ETG can be built that includes external network preferences (e.g., from eBGP or the like) with local preferences.

Preferring one path over another reduces to route preferences on devices along the path. When multiple processes on a device each have a route to a destination prefix, the route with the lower administrative distance can be preferred. Administrative distance is used locally by a router to prefer routes learned by different processes. Note that administrative distance is set at the process level for all dynamic routing processes, except for static routes it is set at the route (destination) level.

Within a routing process instance, the best route depends on the protocol used where different protocols use different metrics for selecting best routes. For example, OSPF is a link state protocol where each node globally computes the minimum cost path to the destination based on edge costs on a path. RIP is a distance vector protocol that computes shortest paths based on hop count. BGP is a path vector protocol where cost is associated with paths rather than with links. BGP computes the best path by comparing local preference first followed by path length. Unlike IGPs (e.g., OSPF and RIP), BGP is flexible in that route preferences may be set at a more granular level (per prefix) instead of globally.

Embodiments can determine administrative distance preferences using a simple path traversal within each dETG. Given a desired primary path, determine for each device along the path if there are multiple processes on the device that offer different routes (and accordingly paths) to the destination. If so, mark the process with the desired path as preferred within the solution dETG. Then reconcile the preferences across all primary path constraints. In some embodiments, administrative distance for static routes is applied at the route level rather than at the process level, which makes it simpler.

It remains to adjust protocol specific attributes (such as link and path costs, and local preferences) within each protocol instance to satisfy primary path constraints. Embodiments can divide this problem into sub-problems, one for each routing instance. Embodiments can encode and solve each sub-problem using a constraint solving technique.

For each IGP instance (e.g., OSPF, RIP, enhanced interior gateway routing protocol (EIGRP)), create an instance ETG that contains sources and sinks for all traffic classes that use the instance and have primary path policies. Other routing instances that redistribute routes into this instance are abstracted away, essentially only keeping the redistribution edges. Each edge can be assigned a default weight based on the routing protocol: for example, OSPF inter-device edges can be assigned weight corresponding to the OSPF edge cost, RIP edge weights can be set to unity, eBGP edge weights can be set to unity, and route redistribution edge weights can correspond to a static cost metric attached to the route. Each edge within an instance ETG can be assigned a cost variable. Global hard constraints ensure the sum of the primary path edge costs is less than that of any alternative path that exists in the control plane. Soft constraints set the edge costs to their values in the existing configuration to ensure configuration changes are minimized. This problem can take advantage of parallelization since a metric of each instance can be optimized independently.

The networks of interest can have a single eBGP speaker. Thus, it is only needed to model redistribution of BGP routes into IGPs. For eBGP, given its flexibility where preferences are assigned per destination, embodiments can encode and solve one instance per destination instead of a single global instance. The eBGP encoding can add node variables to represent local preferences and/or edge variables to represent autonomous system (AS) path prepending. These constraints ensure that the primary path is preferred by traversing the graph backwards from the destination to the source.

ACLs

Embodiments can add/remove ACLs to help ensure the reachability policies are satisfied, while minimizing the number of configuration changes needed. Embodiments additionally allow operators to optionally specify the set of interfaces in the network that must enforce ACL whitelisting. An interface whitelist file can be provided as input to embodiments during the repair process along with the intent.

ACL whitelisting can be performed as a pre-processing step. Embodiments can create a copy of input configuration files that convert inbound and outbound ACLs on the specified whitelist interfaces to whitelists. If no ACLs exist on the interface being whitelisted or blacklist ACLs exist, new whitelist inbound and outbound ACLs can be created on the interface. When the existing ACLs are whitelists, they are left modified. This pre-processed copy of the configuration is then used as input configuration to the repair technique that computes the optimal pathset (see pseudocode above). Then an ACL modification technique can be used to compute a set of ACL modifications (edges) where each adding (removing) an edge corresponds to removing (adding) an ACL on one of the interfaces of the edge.

Figure 5:
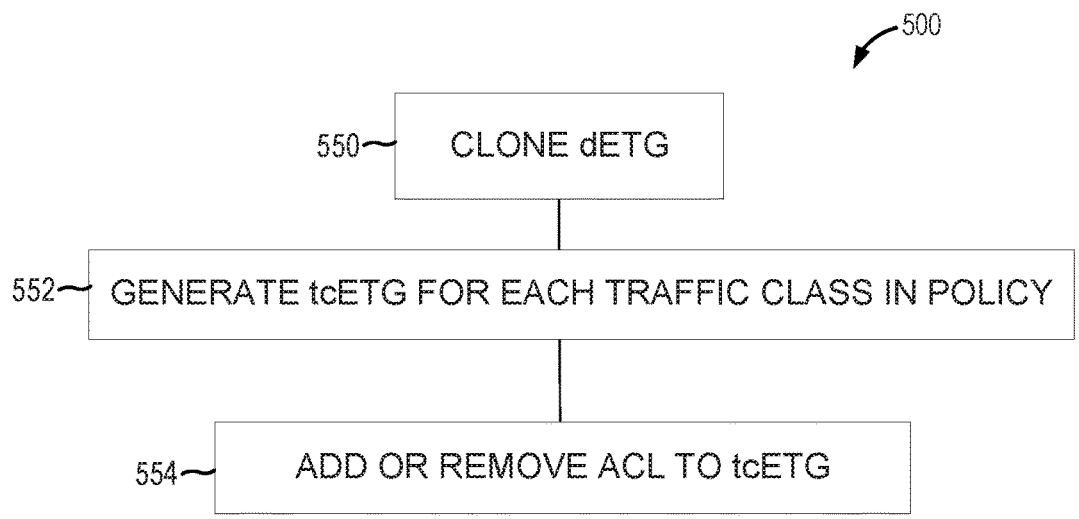
FIG. 5 illustrates, by way of example, a diagram of an embodiment of a method for network re-configuration, such as for repair.

FIG. 5 illustrates, by way of example, a diagram of an embodiment of a method 500 for network re-configuration, such as for repair. The method 500 as illustrated includes cloning a dETG (e.g., all the dETGs or edETGs generated using the operation 440 or the method 400, at operation 550; generating a tcETG for each traffic class in a policy (in a same manner as detailed in CPR), at operation 552; and adding or removing an ACL to the tcETG, at operation 554. The method 500 can include removing edges not in a determined optimal pathset in the dETGs/edETGs from the dETGs/edETGs to generate reduced dETGs/edETGs before performing operation 552. The method 500 can include unsetting any set block or virtual flags in the dETG and removing any edges not in the reduced dETGs/edETGs before performing operation 552. The operation 552 can be performed on the reduced dETGs/edETGs. The method 500 can include determining minimum cuts on the generated tcETG and adding an ACL for each edge cut based on the determined minimum cuts. A minimum cut is a partition of vertices of a graph into two disjoint subsets that joined by at least one edge. The partition is minimal in some sense. The operation 552 can include removing an ACL for a traffic class that is k-reachable according to a policy and does not include a corresponding edge tcETG.

Pseudocode for the method 500 is provided below. The variables dpblocktc output by the pseudocode specify the traffic classes that require blocking at the data plane using ACLs. Let $T_b$ be the set of all such traffic classes i.e., $T_b=\{tc:dpblock_{tc}\}$. Note that $T_b \subseteq B$ since some of the traffic classes may be blocked at the control plane. The following pseudocode first computes the solution tcETG graphs for each traffic class in the policy, started from the solution dETG for the traffic class destination (Lines 1-15). A minCut technique can be used to determine the minimum number of edges to be removed in each tcETG; these correspond to ACLs being added. A unit weight graph can be provided as input to the minCut technique (where fixed edges are assigned infinite cost so they are not chosen for cuts) (Lines 17-22).

The pseudocode Lines 23-31 remove any existing ACLs that block reachable traffic classes, ensuring failure consistency for reachability, such that any reachable traffic class is reachable despite any combination of failures (on all control plane paths). The resulting edge additions and removals are translated into ACL removals and additions, respectively.

Pseudocode for Computing ACLs:
//clone the dETGs and retain only edge solutions
1. for each $G_{dst}$ do
2. $G_{dst}=G_{dst}$.clone( )
3. for each $(u, v)_{dst} \in E'_{dst}$ do
4. if $e(u, v)_{dst}$ then
5. $(u, v)_{dst}$.set( ) //unset blocked and virtual flags
6. else
7. $(u, v)_{dst}$.remove( )
8. end if
9. end for
10. end for
// Compute the tcETG $G_{tc}$ for each traffic class
11. for each tc do
12. $G_{tc}(V_{tc},E_{tc})=G_{tc.dst}$.clone( )
13. $G_{tc}$.filterSrcs( ) // remove source vertexes except for tc.src
14. $G_{tc}$.filterACLEdges( ) // remove all edges blocked by an ACL
15. end for
// Block traffic classes in Tb, remove edge→add ACL
16. Initialize MAP tcMods to track edge modifications
17. for each $tc \in T_b$ do
18. $G_{tc}$.calculate MinCut(tc.src, tc.dst)
19. EdgesToRemove=$G_{tc}$.getCutEdges( )
20. $G_{tc}$.removeEdges(edgesToRemove)
21. tcMods.putAll(edgesToRemove) //Remove edge mods
22. end for
// Unblock traffic classes in R, add edge→remove ACL
23. for each tc∈R do
24. activePaths $G'_{tc.dst}$.allPaths(tc.src, tc.dst)
25. for each $(u, V)_{dst} \in$ activePaths do
26. if $(u, v)_{dst} \not\in G_{tc}$ then // Blocked by an ACL
27. $G_{tc}$. addEdge((u, V)$_{dst}$)
28. tcMods.put((u, v)$_{dst}$) // Add edge mod
29. end if
30. end for
31. end for Minimizing the Control Plane A property of dETGs is that edges correspond to control plane constructs. One can extend embodiments with recommendations to remove unnecessary edges, those edges that are not needed to satisfy intent. This results in removing all unnecessary control plane attack surface. This can be accomplished by finding a solution with the minimal number of changes needed as defined by the encoding technique pseudocode. Call this S*. Then compute the set of edge assertions for all the changes that S* introduces. For example, if an edge e was flipped from virtual to enabled, assert(e). Then solve the problem again with the same encoding of constraints (not the soft assertions) with an additional set of constraints for S* (the model), where soft constraints negate every edge effectively minimizing the number of enabled edges in the minimal repair solution. The resulting model reveals all edges that should be disabled. These can be thought of as recommendations for minimizing the control plane, but removing these edges is not necessary for correctness.

Figure 6:
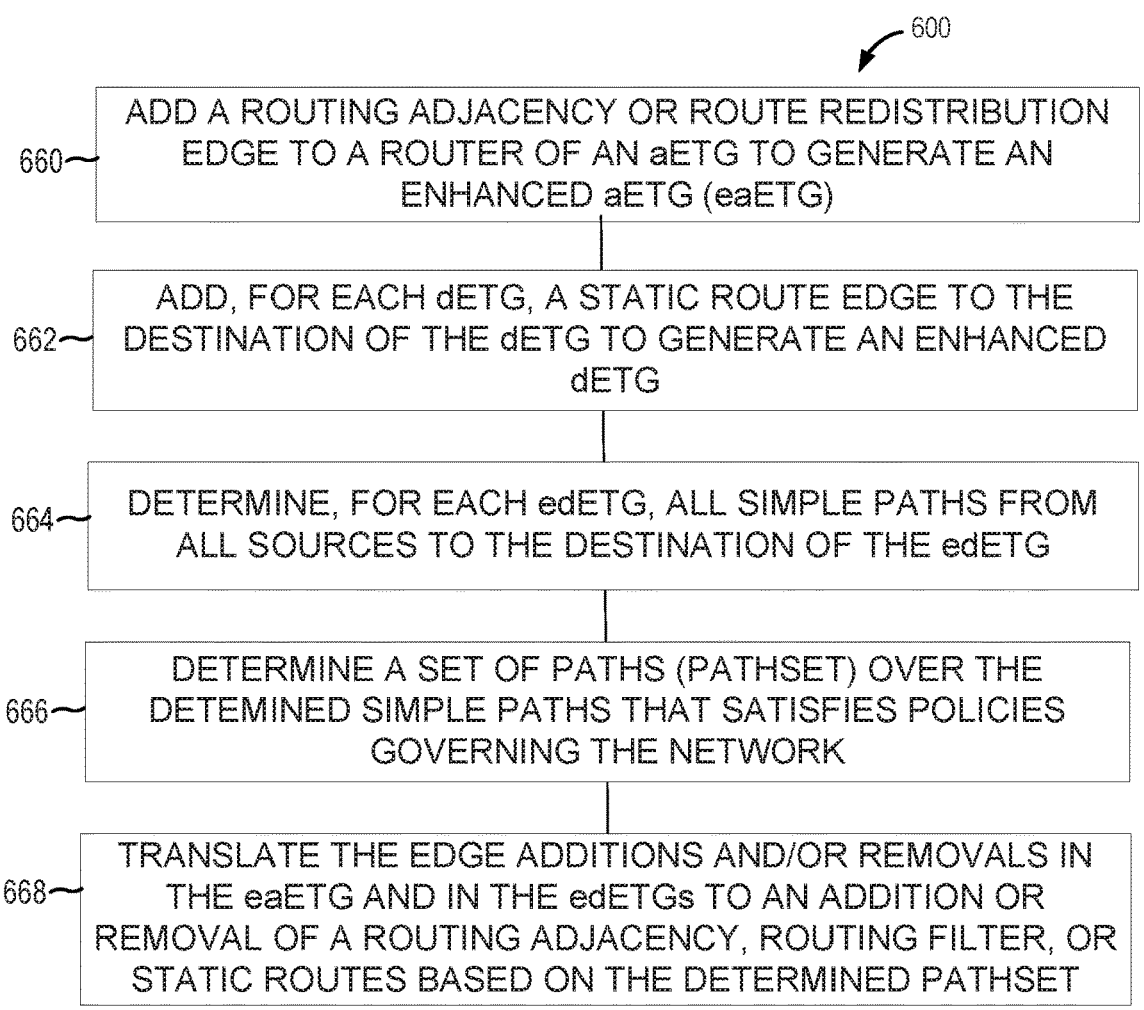
FIG. 6 illustrates, by way of example, a diagram of an embodiment of a method for network re-configuration or repair.

FIG. 6 illustrates, by way of example, a diagram of an embodiment of a method 600 for network re-configuration or repair. The method 600 as illustrated includes add a routing adjacency or route redistribution edge to a router of the aETG to generate an eaETG, at operation 660; adding, for each dETG, static route edges to the destination of the dETG to generate an edETG, at operation 662; determining, for each of the edETGs, all simple paths from all sources to the destination of the edETG, at operation 664; determining a set of paths (pathset) over the determined simple paths that satisfies the policies, at operation 666; and translating the edge additions and/or removals in the eaETG and in the edETGs to an addition and/or removal of one or more of a routing adjacency, routing filter, or static route based on the determined pathset, at operation 668.

The method 600 can further include marking as virtual the added routing adjacency or route redistribution edge (from operation 660) of the eaETG. The method 600 can further include marking as virtual the added static route edges of the edETG (from operation 662). The method 600 can further include adding, to the edETG, endpoint vertexes for all sources that are part of the desired policies, whether allowed or not allowed, to communicate with the destination corresponding to the edETG.

The method 600 can further include mark edges of the edETG that correspond to blocked traffic according to the policies, as blocked. The method 600 can further include removing, from each edETG, static route vertexes and edges for all other destinations but the destination corresponding to edETG. The method 600 can further include wherein determining the pathset over the determined simple paths that satisfies the policies includes encoding such that an edge appears in at most one of the k paths that satisfy a k-reachable policy of the policies. The method 600 can further include, wherein encoding further includes encoding using a hard constraint and a soft constraint on blocked traffic such that only if all control plane paths cannot be blocked, then block the traffic at a corresponding data plane.

The method 600 can further include removing edges not in the resulting pathset from the edETG, and generate a traffic class ETG (tcETG) for each traffic class, and alter the tcETG by adding or removing one or more edges. The method 600 can further include, wherein the added or removed one or more edges in tcETG are translated to addition or removal of respective access control lists (ACLs).

Figure 7:
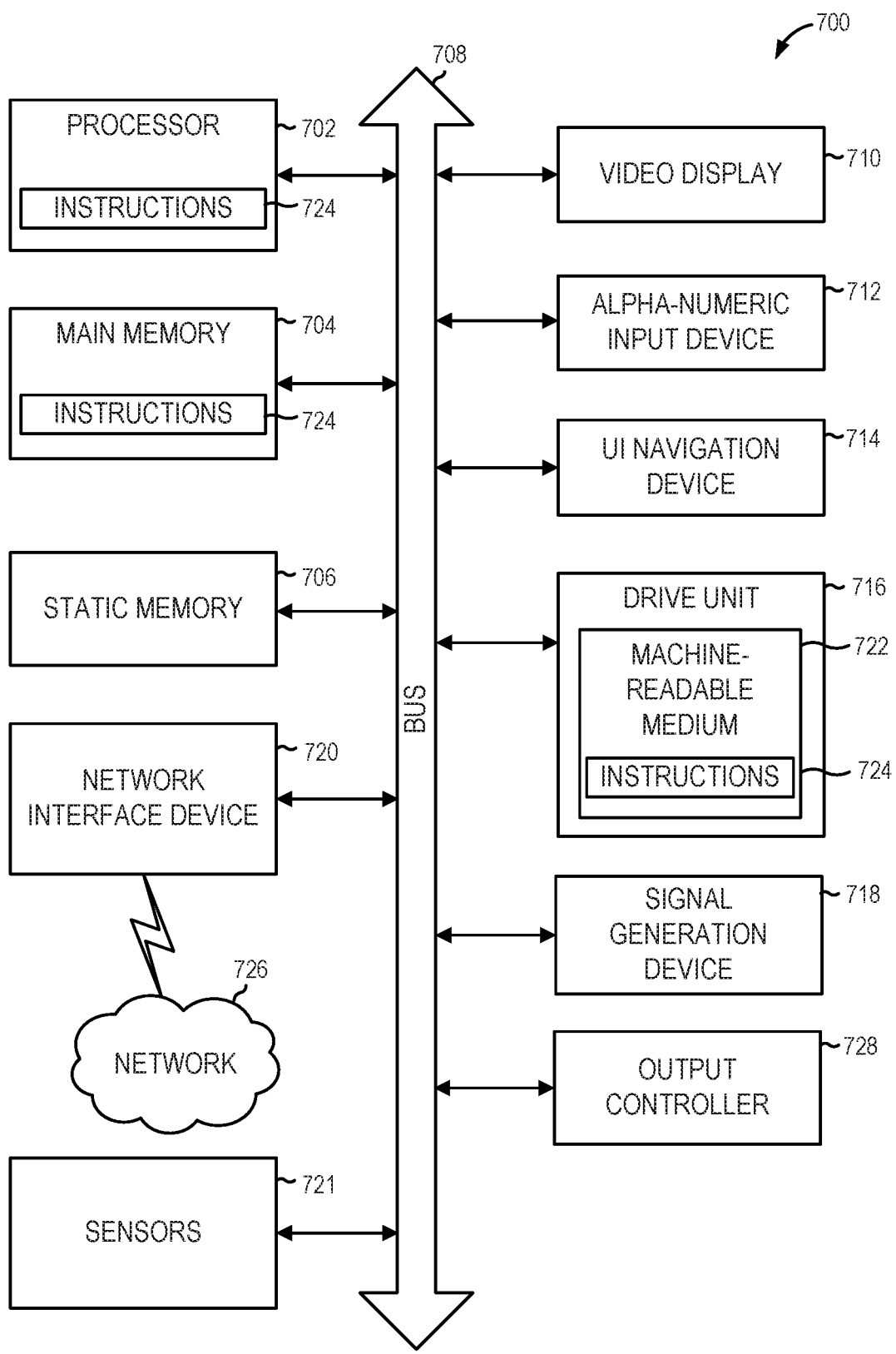
FIG. 7 illustrates a circuit block diagram of a computing machine in accordance with some embodiments.

FIG. 7 illustrates a circuit block diagram of a computing machine 700 in accordance with some embodiments. In some embodiments, components of the computing machine 700 may store or be integrated into other components shown in the circuit block diagram of FIG. 7. For example, portions of the computing machine 700 may reside in the processor 702 and may be referred to as "processing circuitry." Processing circuitry may include processing hardware, for example, one or more central processing units (CPUs) and one or more graphics processing units (GPUs), and the like. In alternative embodiments, the computing machine 700 may operate as a standalone device or may be connected (e.g., networked) to other computers. In a networked deployment, the computing machine 700 may operate in the capacity of a server, a client, or both in server-client network environments. In an example, the computing machine 700 may act as a peer machine in peer-to-peer (P2P) (or other distributed) network environment. In this document, the phrases P2P, device-to-device (D2D) and sidelink may be used interchangeably. The computing machine 700 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 700 may include a hardware processor 702 (e.g., a central processing unit (CPU), a GPU, a hardware processor core, or any combination thereof), a main memory 704 and a static memory 706, some or all of which may communicate with each other via an interlink (e.g., bus) 708. Although not shown, the main memory 704 may contain any or all of removable storage and non-removable storage, volatile memory or non-volatile memory. The computing machine 700 may further include a video display unit 710 (or other display unit), an alphanumeric input device 712 (e.g., a keyboard), and a user interface (UI) navigation device 714 (e.g., a mouse). In an example, the display unit 710, input device 712 and UI navigation device 714 may be a touch screen display. The computing machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or another sensor. The computing machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 716 (e.g., a storage device) may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the computing machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the computing machine 700 and that cause the computing machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726.

Embodiments provide systems, devices, and techniques for rapid and verifiable repair of network configurations to meet a specification of operator intent. Embodiments can scale to large networks with intents, with performance exceeding the state of the art by at least two orders of magnitude.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Additional Notes and Example Embodiments

Example 1 includes a network configuration repair apparatus, the apparatus comprising memory with policies, extended topology graphs (ETGs) including an all ETG (aETG), and destination ETGs (dETGs) for each policy destination in the policies, stored thereon, and processing circuitry configured to add a routing adjacency or route redistribution edge to a router of the aETG to generate an enhanced aETG (eaETG), add, for each dETG of the dETGs, static route edges to the destination of the dETG to generate an enhanced dETG (edETG), determine, for each of the edETGs, all simple paths from all sources to the destination of the edETG, determine an set of paths (pathtset) over the determined simple paths that satisfies the policies, and translate the edge additions and/or removals in the eaETG and in the edETGs to one or more of an addition and/or removal of a routing adjacency, routing filter, or static routes based on the determined pathset.

In Example 2, Example 1 further includes, wherein the processing circuitry is configured to mark as virtual the added routing adjacency or route redistribution edge of the eaETG.

In Example 3, Example 2 further includes, wherein the processing circuitry is configured to mark as virtual the added static route edges of the edETG.

In Example 4, Example 3 further includes, wherein the processing circuitry is configured to add, to the edETG, endpoint vertexes for all sources that are part of the desired policies, whether allowed or not allowed, to communicate with the destination corresponding to the edETG.

In Example 5, Example 4 further includes, wherein the processing circuitry is configured to mark edges of the edETG that correspond to blocked traffic according to the policies, as blocked.

In Example 6, Example 5 further includes, wherein the processing circuitry is configured to remove, from each edETG, remove static route vertexes and edges for all other destinations but the destination corresponding to edETG.

In Example 7, at least one of Examples 1-6 further includes, wherein determining an optimal pathset over the determined simple paths that satisfies the policies includes encoding such that an edge appears in at most one of the k paths that satisfy a k-reachable policy of the policies.

In Example 8, Example 7 further includes, wherein encoding further includes encoding using a hard constraint and a soft constraint on blocked traffic such that only if all control plane paths cannot be blocked, then block the traffic at a corresponding data plane.

In Example 9, Example 8 further includes, wherein the processing circuitry is configured to remove edges not in the resulting pathset from the edETG, and generate a traffic class ETG (tcETG) for each traffic class, and alter the tcETG by adding or removing one or more edges.

In Example 10, Example 9 further includes, wherein the added or removed one or more edges in tcETG are translated to addition or removal of respective access control lists (ACLs).

Example 11 includes a computer-implemented method for network configuration repair, the method comprising adding a routing adjacency or route redistribution edge to a router of an all extended topology graph (ETG) (aETG) to generate an enhanced aETG (eaETG), adding, for each destination ETG (dETG) of dETGs, static route edges to a destination of the dETG to generate an enhanced dETG (edETG), determining, for each of the edETGs, all simple paths from all sources to the destination of the edETG, determining a set of paths (pathtset) over the determined simple paths that satisfies the policies, and translating the edge additions and/or removals in the eaETG and in the edETGs to one or more of an addition and/or removal of a routing adjacency, routing filter, or static route based on the determined pathset.

In Example 12, Example 11 further includes marking as virtual the added routing adjacency or route redistribution edge of the eaETG.

In Example 13, Example 12 further includes marking as virtual the added static route edges of the edETG.

In Example 14, Example 13 further includes adding, to the edETG, endpoint vertexes for all sources that are part of the desired policies, whether allowed or not allowed, to communicate with the destination corresponding to the edETG.

In Example 15, Example 14 further includes marking edges of the edETG that correspond to blocked traffic according to the policies, as blocked.

Example 16 includes a non-transitory machine-readable medium including instructions that, when executed by a machine, cause the machine to perform operations for network reconfiguration or repair, the operations comprising adding a routing adjacency or route redistribution edge to a router of an aETG to generate an enhanced aETG (eaETG), adding, for each dETG of dETGs, static route edges to a destination of the dETG to generate an enhanced dETG (edETG), determining, for each of the edETGs, all simple paths from all sources to the destination of the edETG, determining a set of paths (pathtset) over the determined simple paths that satisfies the policies, and translating the edge additions and/or removals in the eaETG and in the edETGs to one or more of an addition and/or removal of a routing adjacency, routing filter, or static route based on the determined pathset.

In Example 17, Example 16 further includes, wherein the operations further include removing, from each edETG, static route vertexes and edges for all other destinations but the destination corresponding to edETG.

In Example 18, at least one of Examples 16-17 further includes, wherein determining an optimal pathtset over the determined simple paths that satisfies the policies includes encoding such that an edge appears in at most one of the k paths that satisfy a k-reachable policy of the policies.

In Example 19, Example 18 further includes, wherein encoding further includes encoding using a hard constraint and a soft constraint on blocked traffic such that only if all control plane paths cannot be blocked, then block the traffic at a corresponding data plane.

In Example 20, Example 19 further includes, wherein the operations further include removing edges not in the resulting pathset from the edETG, and generate a traffic class ETG (tcETG) for each traffic class, and alter the tcETG by adding or removing one or more edges, and wherein the added or removed one or more edges in tcETG are translated to addition or removal of respective access control lists (ACLs).

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A network configuration repair apparatus, the apparatus comprising:
    memory with policies, extended topology graphs (ETGs) including an all ETG (aETG), and destination ETGs (dETGs) for each policy destination in the policies, stored thereon; and
    processing circuitry configured to:
        add a routing adjacency or route redistribution edge to a router of the aETG to generate an enhanced aETG (eaETG);
        add, for each dETG of the dETGs, static route edges to the destination of the dETG to generate an enhanced dETG (edETG);
        determine, for each of the edETGs, all simple paths from all sources to the destination of the edETG;
        determine a set of paths (pathtset) over the determined simple paths that satisfies the policies; and
        translate the edge additions and/or removals in the eaETG and in the edETGs to an addition and/or removal of one or more of a routing adjacency, routing filter, or static route based on the determined pathset.

2. The apparatus of claim 1, wherein the processing circuitry is configured to mark as virtual the added routing adjacency or route redistribution edge of the eaETG.

3. The apparatus of claim 2, wherein the processing circuitry is configured to mark as virtual the added static route edges of the edETG.

4. The apparatus of claim 3, wherein the processing circuitry is configured to add, to the edETG, endpoint vertexes for all sources that are part of the desired policies, whether allowed or not allowed, to communicate with the destination corresponding to the edETG.

5. The apparatus of claim 4, wherein the processing circuitry is configured to mark edges of the edETG that correspond to blocked traffic according to the policies, as blocked.

6. The apparatus of claim 5, wherein the processing circuitry is configured to remove, from each edETG, static route vertexes and edges for all other destinations but the destination corresponding to edETG.

7. The apparatus of claim 1, wherein determining the pathset over the determined simple paths that satisfies the policies includes encoding such that an edge appears in at most one of the k paths that satisfy a k-reachable policy of the policies.

8. The apparatus of claim 7, wherein encoding further includes encoding using a hard constraint and a soft constraint on blocked traffic such that only if all control plane paths cannot be blocked, then block the traffic at a corresponding data plane.

9. The apparatus of claim 8, wherein the processing circuitry is configured to remove edges not in the resulting pathset from the edETG, and generate a traffic class ETG (tcETG) for each traffic class, and alter the tcETG by adding or removing one or more edges.

10. The apparatus of claim 9, wherein the added or removed one or more edges in tcETG are translated to addition or removal of respective access control lists (ACLs).

11. A computer-implemented method for network configuration repair, the method comprising:
  adding a routing adjacency or route redistribution edge to a router of an aETG to generate an enhanced aETG (eaETG);
  adding, for each dETG of dETGs, static route edges to a destination of the dETG to generate an enhanced dETG (edETG);
  determining, for each of the edETGs, all simple paths from all sources to the destination of the edETG;
  determining a set of paths (pathset) over the determined simple paths that satisfies the policies; and
  translating the edge additions and/or removals in the eaETG and in the edETGs to an addition and/or removal of one or more of a routing adjacency, routing filter, or static route based on the determined pathset.

12. The method of claim 11, further comprising marking as virtual the added routing adjacency or route redistribution edge of the eaETG.

13. The method of claim 12, further comprising marking as virtual the added static route edges of the edETG.

14. The method of claim 13, further comprising adding, to the edETG, endpoint vertexes for all sources that are part of the desired policies, whether allowed or not allowed, to communicate with the destination corresponding to the edETG.

15. The method of claim 14, further comprising marking edges of the edETG that correspond to blocked traffic according to the policies, as blocked.

16. A non-transitory machine-readable medium including instructions that, when executed by a machine, cause the machine to perform operations for network reconfiguration or repair, the operations comprising:
  adding a routing adjacency or route redistribution edge to a router of an aETG to generate an enhanced aETG (eaETG);
  adding, for each dETG of dETGs, static route edges to a destination of the dETG to generate an enhanced dETG (edETG);
  determining, for each of the edETGs, all simple paths from all sources to the destination of the edETG;
  determining a set of paths (pathset) over the determined simple paths that satisfies the policies; and
  translating the edge additions and/or removals in the eaETG and in the edETGs to an addition and/or removal of one or more of a routing adjacency, routing filter, or static route based on the determined pathset.

17. The non-transitory machine-readable medium of claim 16, wherein the operations further include removing, from each edETG, static route vertexes and edges for all other destinations but the destination corresponding to edETG.

18. The non-transitory machine-readable medium of claim 16, wherein determining the pathset over the determined simple paths that satisfies the policies includes encoding such that an edge appears in at most one of the k paths that satisfy a k-reachable policy of the policies.

19. The non-transitory machine-readable medium of claim 18, wherein encoding further includes encoding using a hard constraint and a soft constraint on blocked traffic such that only if all control plane paths cannot be blocked, then block the traffic at a corresponding data plane.

20. The non-transitory machine-readable medium of claim 19, wherein the operations further include:
  removing edges not in the resulting pathset from the edETG, and generate a traffic class ETG (tcETG) for each traffic class, and alter the tcETG by adding or removing one or more edges,
  wherein the added or removed one or more edges in tcETG are translated to addition or removal of respective access control lists (ACLs).

* * * * *